(12) United States Patent
Jamil et al.

(10) Patent No.: US 6,775,748 B2
(45) Date of Patent: Aug. 10, 2004

(54) METHODS AND APPARATUS FOR TRANSFERRING CACHE BLOCK OWNERSHIP

(75) Inventors: Sujat Jamil, Chandler, AZ (US); Samantha J. Edirisooriya, Tempe, AZ (US); David E. Miner, Chandler, AZ (US); R. Frank O'Bleness, Tempe, AZ (US); Steven J. Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 10/057,493

(22) Filed: Jan. 24, 2002

(65) Prior Publication Data

US 2003/0140200 A1 Jul. 24, 2003

(51) Int. Cl.[7] .............................................. G06F 12/00
(52) U.S. Cl. ........................ 711/145; 711/141; 711/144; 711/145; 711/146; 711/128; 711/143
(58) Field of Search ................................. 711/144, 145, 711/141, 146, 128, 143

(56) References Cited

U.S. PATENT DOCUMENTS

| | | | | |
|---|---|---|---|---|
| 5,664,150 A | * | 9/1997 | Isaac et al. ................ | 711/143 |
| 5,913,226 A | * | 6/1999 | Sato .......................... | 711/146 |
| 6,438,660 B1 | * | 8/2002 | Reams ...................... | 711/143 |
| 6,549,990 B2 | * | 4/2003 | Hughes et al. ............. | 711/146 |
| 6,615,322 B2 | * | 9/2003 | Arimilli et al. ............ | 711/145 |

* cited by examiner

Primary Examiner—Donald Sparks
Assistant Examiner—Ngoc V Dinh
(74) Attorney, Agent, or Firm—Grossman & Flight, LLC

(57) ABSTRACT

Methods and apparatus for transferring cache block ownership from a first cache to a second cache without performing a writeback to a main memory are disclosed. Prior to the ownership transfer, the first cache holds the memory block in an "owned" state, and the second cache holds the same memory block in a "shared" state. Main memory does not yet reflect modifications made to the memory block. When the processor associated with the first cache attempts to write-back the modified memory block to main memory, the second cache asserts a signal to the first cache which cancels the write-back. In addition, the memory block in the second cache changes to an "owned" state. If additional caches also hold the memory block, an arbitration mechanism selects one cache to be the new owner. In this manner, communications with main memory and power consumption are reduced.

31 Claims, 6 Drawing Sheets

METHODS AND APPARATUS FOR TRANSFERRING CACHE BLOCK OWNERSHIP

TECHNICAL FIELD

The present invention relates in general to cache memory and, in particular, to methods and apparatus for transferring cache block ownership.

BACKGROUND

In an effort to increase computational power, many computing systems are turning to multi-processor systems. A multi-processor system typically includes a plurality of microprocessors, a plurality of associated caches, and a main memory. In an effort to reduce bus traffic to the main memory, many multi-processor systems use a "write-back" (as opposed to a "write-through") policy. A "write-back" policy is a cache procedure whereby a microprocessor may locally modify data in its cache without updating the main memory until the cache data needs to be replaced. In order to maintain cache coherency in such a system, a cache coherency protocol may be used.

In an effort to further reduce bus traffic to the main memory, many of these cache coherency protocols allow a first cache that is holding locally modified data (i.e., "dirty" data) to directly supply a second cache that is requesting the same block, without updating main memory. Typically, the first cache then puts its memory block in an "owned" state to indicate that the block is "dirty" and shared. However, when the "owned" block is replaced, the first cache must write the block back to main memory so that the modifications are not lost. This write-back generates bus traffic to the main memory. Bus traffic increase memory latency and power consumption. Subsequent modifications to the memory block in the second cache will also need to be written-back to main memory, thereby generating additional bus traffic.

BRIEF DESCRIPTION OF THE DRAWINGS

Features and advantages of the disclosed methods and apparatus will be apparent to those of ordinary skill in the art in view of the detailed description of certain embodiments which is made with reference to the drawings, a brief description of which is provided below.

DETAILED DESCRIPTION OF EXAMPLE EMBODIMENTS

In general, the methods and apparatus described herein transfer ownership of a memory block from a first cache to a second cache without performing a writeback to a main memory. Prior to the ownership transfer, the first cache holds the memory block in an "owned" state, and the second cache holds the same memory block in a "shared" state. The memory block in the second cache includes modifications made to the memory block by a processor associated with the first cache. However, the main memory does not yet reflect these modifications. When the processor associated with the first cache attempts to write-back the modified memory block to the main memory, the second cache asserts a signal to the first cache which cancels the write-back. In addition, the memory block in the second cache changes to an "owned" state. If additional caches also hold the memory block, an arbitration mechanism selects one cache to be the new owner. In this manner, communications with main memory and power consumption are reduced.

Figure 1:
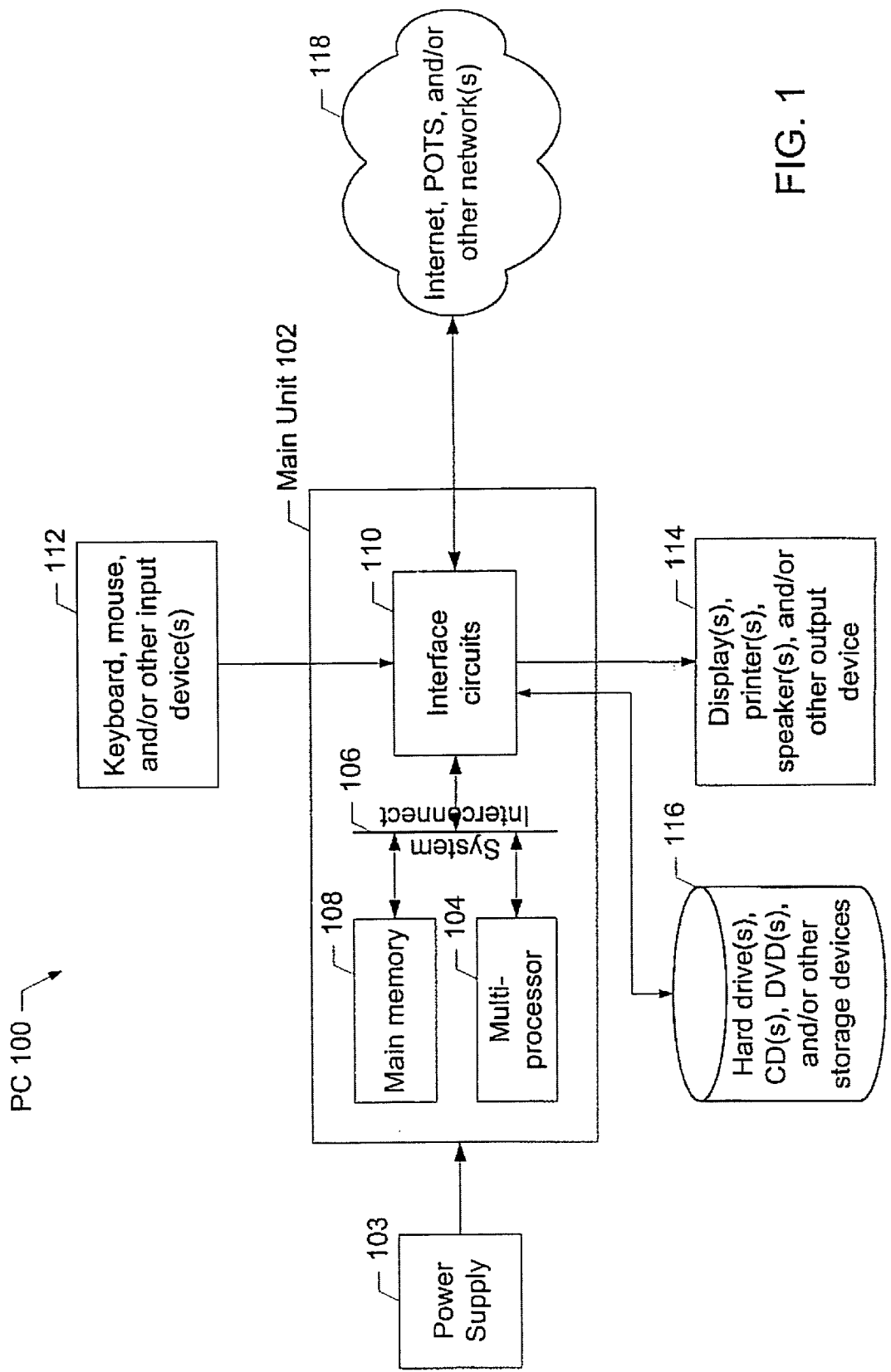
FIG. 1 is a high level block diagram of a computer system illustrating an environment of use for the present invention.

A block diagram of a computer system 100 is illustrated in FIG. 1. The computer system 100 may be a personal computer (PC), a personal digital assistant (PDA), an Internet appliance, a cellular telephone, or any other computing device. In an embodiment, the computer system 100 includes a main processing unit 102 powered by a power supply 103. The main processing unit 102 may include a multi-processor unit 104 electrically coupled by a system interconnect 106 to a main memory device 108 and one or more interface circuits 110. In an embodiment, the system interconnect 106 is a address/data bus. Of course, a person of ordinary skill in the art will readily appreciate that interconnects other than busses may be used to connect the multi-processor unit 104 to the main memory device 108. For example, one or more dedicated lines and/or a crossbar may be used to connect the multi-processor unit 104 to the main memory device 108.

The multi-processor 104 may include any type of well known central processing unit (CPU), such as a microprocessor from the Intel Pentium™ family of microprocessors, the Intel Itanium™ family of microprocessors, and/or the Intel XScale™ family of processors., and any type of well known cache memory, such as static random access memory (SRAM). The main memory device 108 may include dynamic random access memory (DRAM), but may also include non-volatile memory. In an embodiment, the main memory device 108 stores a software program which is executed by one or more of the processing agents 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. For example, an input device 112 may be a keyboard, mouse, touch screen, track pad, track ball, isopoint, and/or a voice recognition system.

One or more displays, printers, speakers, and/or other output devices 114 may also be connected to the main processing unit 102 via one or more of the interface circuits 110. The display 114 may be cathode ray tube (CRTs), liquid crystal displays (LCDs), or any other type of display. The display 114 may generate visual indications of data generated during operation of the main processing unit 102. The visual displays may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
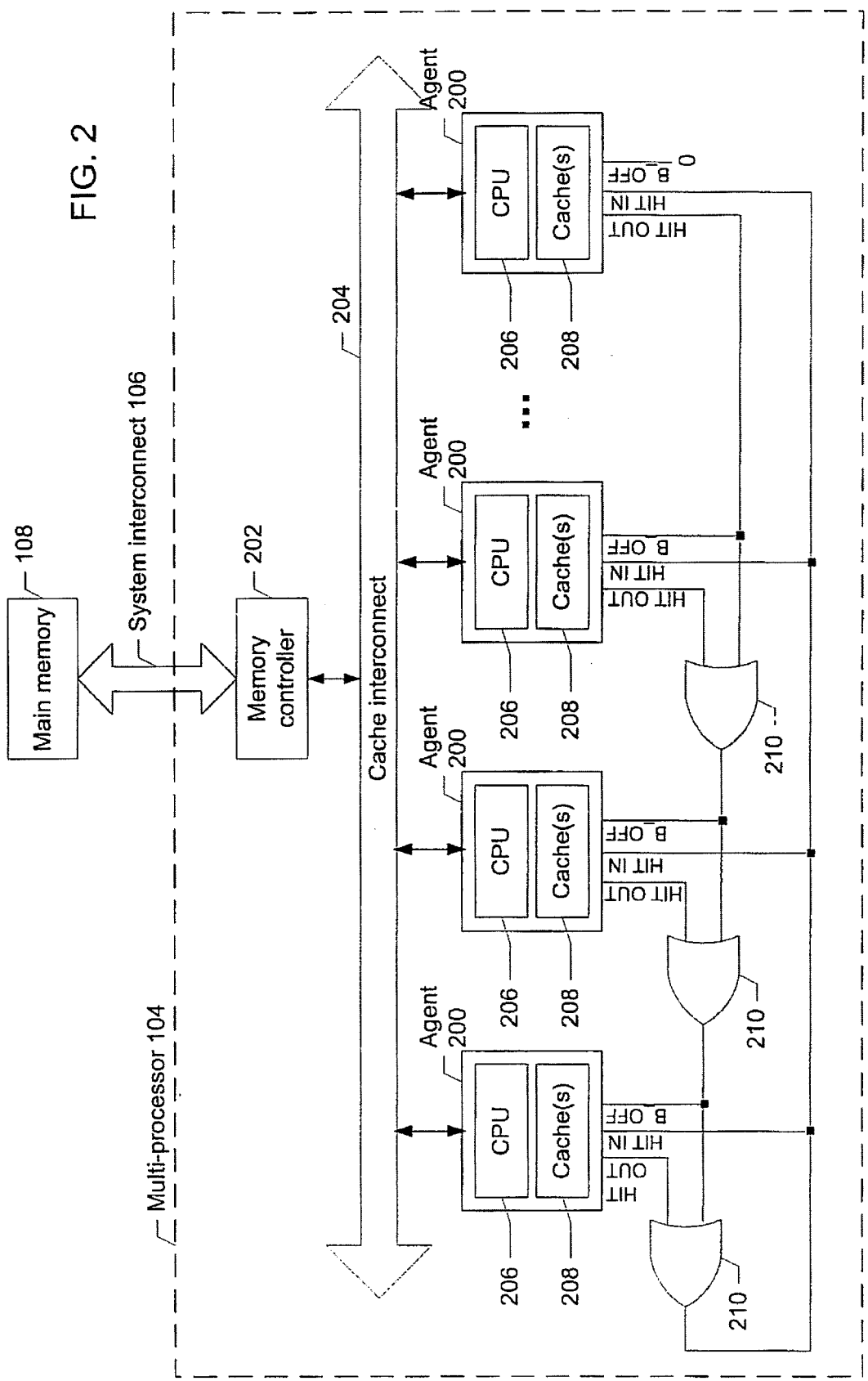
FIG. 2 is a more detailed block diagram of the multi-processor illustrated in FIG. 1.

A more detailed block diagram of the multi-processor unit 104 is illustrated in FIG. 2. Although certain signal names are used to describe this embodiment, a person of ordinary skill in the art will readily appreciate that the name of each of the signal lines described herein is irrelevant to the operation of the signal line. Similarly, although certain connection schemes and logic gates are used to describe this embodiment, a person of ordinary skill in the art will readily appreciate that many other connection schemes and/or logic gates may be used without departing from the scope or spirit of the present invention.

In the embodiment illustrated in FIG. 2, the multi-processor 104 includes a plurality of processing agents 200 and a memory controller 202 electrically coupled by a cache interconnect 204. The cache interconnect 204 may be any type of interconnect such as a bus, one or more dedicated lines, and/or a crossbar. Each of the components of the multi-processor 104 may be on the same chip or on separate chips. In an embodiment, the main memory 108 resides on a separate chip. Due to the memory controller 202, one processing agent 200 may communicate with another processing agent 200 via the cache interconnect 204 without the communication necessarily generating activity on the system interconnect 106. Typically, if activity on the system interconnect 106 is reduced, overall power consumption is reduced. This is especially true in an embodiment where the main memory 108 resides on a separate chip from the processing agents 200.

Each processing agent 200 may include a central processing unit (CPU) 206 and one or more cache(s) 208. Each cache 208 may include a plurality of memory blocks and a cache controller. As discussed above, each CPU 206 may be any type of well known processor such as an Intel Pentium™ processor. Similarly, each cache may be constructed using any type of well known memory, such as SRAM. In addition, each processing agent 200 may include more than one cache. For example, a processing agent may include a level 1 cache and a level 2 cache. Similarly, a processing agent may include an instruction cache and/or a data cache.

Each processing agent 200 may include at least one signal input and at least one signal output. A "hit out" signal output may be asserted when an agent 200 detects activity on the cache interconnect 204 associated with a memory location for which the agent 200 is currently holding a copy in its cache 208. In an embodiment, each agent "snoops" address lines on a cache interconnect bus and asserts "hit out" each time it sees an address associated with a memory block in its cache. For example, if a first agent initiates a writeback request (i.e., the first agent is about to write a "dirty" block back to main memory), and a second agent holds a copy of the same memory block in its cache, the second agent may assert its "hit out" line.

In an embodiment, one or more of these "hit out" lines are connected to a "hit in" line on each processing agent 200. In an embodiment, all of the "hit out" lines are logically ORed together, by one or more OR gates 210, and the output of the OR gate(s) 210 is connected to each of the "hit in" lines as shown in FIG. 2. In this manner, an active processing agent 200 knows when the cache 208 of another processing agent 200 holds a memory block associated with an activity the active processing agent 200 is performing. However, the active processing agent 200 does not necessarily know which cache 208 holds the memory block. Each processing agent 200 may be structured to use this "hit in" line to initiate and/or cancel any activity the processing agent 200 is capable of performing. For example, an asserted "hit in" line may serve to cancel a write-back to main memory.

In addition, one or more of the "hit out" lines may be connected to a "back-off" input on each processing agent 200. In an embodiment, a first processing agent 200 optionally includes a "back-off" input which is never asserted (e.g., the input is connected to logic zero). This processing agent 200 has the highest priority in an arbitration scheme described in detail below (i.e., no other agent ever tells this agent to "back-off"). A second processing agent 200 may include a "back-off" input which is connected only to the "hit out" of the first processing agent. This processing agent has the second highest priority (i.e., only the highest priority agent can tell this agent to "back-off"). If included in the system, a third processing agent 200 may include a "back-off" input which is connected to the output of a first OR gate 210. The inputs of the first OR gate 210 are in turn connected to the "hit out" signals of the first processing agent 200 and the second processing agent 200. This processing agent has the third highest priority (i.e., either of the highest priority agent and the second highest priority agent can tell this agent to "back-off"). If included in the system, a fourth processing agent 200 may include a "back-off" input which is connected to the output of a second OR gate 210. The inputs of the second OR gate 210 are in turn connected to the "hit out" signal of the third processing agent 200 and the output of the first OR gate 210. This processing agent 200 has the fourth highest priority (i.e., any of the first three agents can tell this agent to "back-off"). This pattern may continue for any number of processing agents 200 as shown in FIG. 2.

Figure 3:
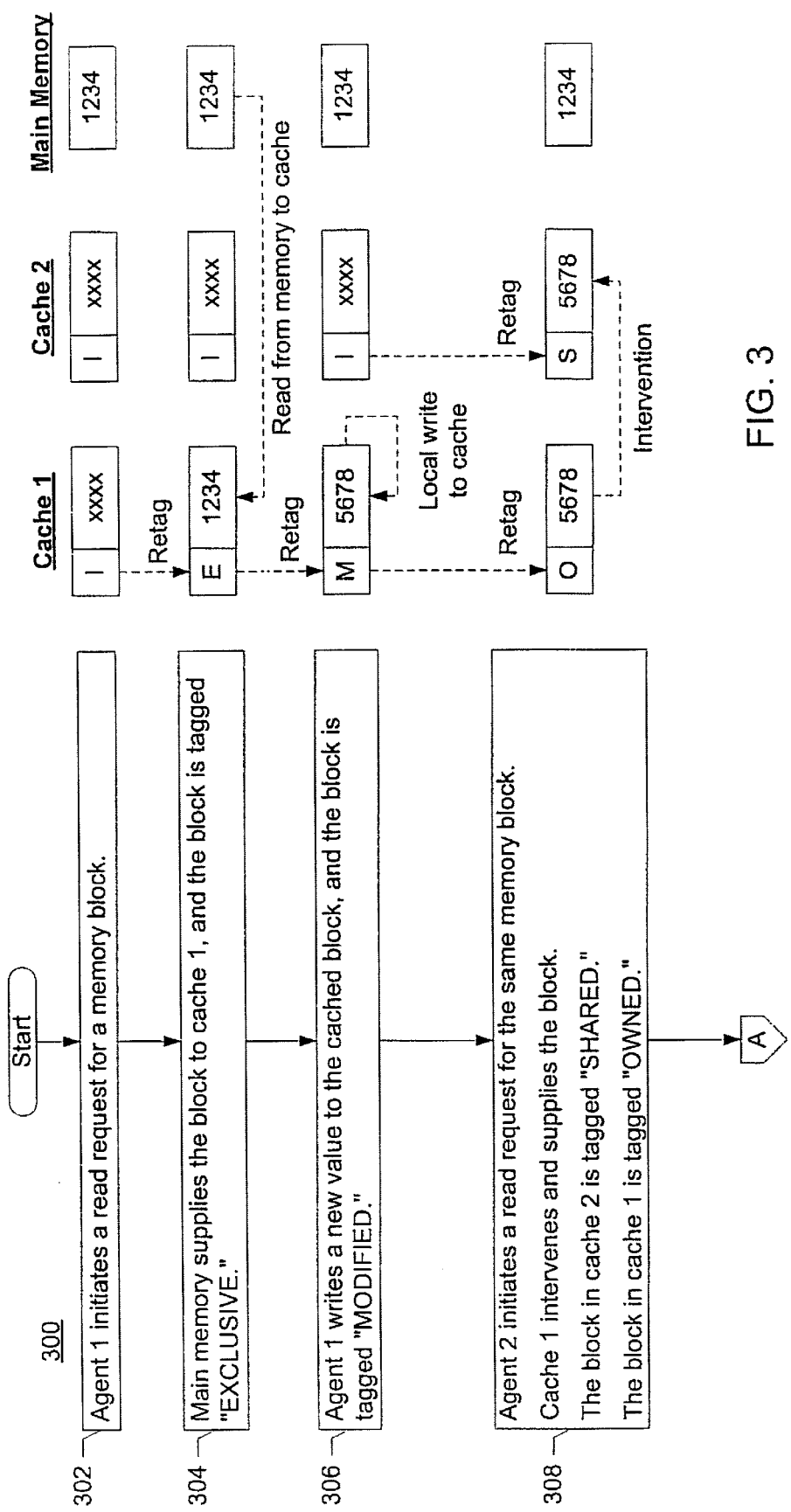
FIG. 3 and FIG. 4 are a flowchart of a process for transferring cache block ownership in a two processor system.
Figure 4:
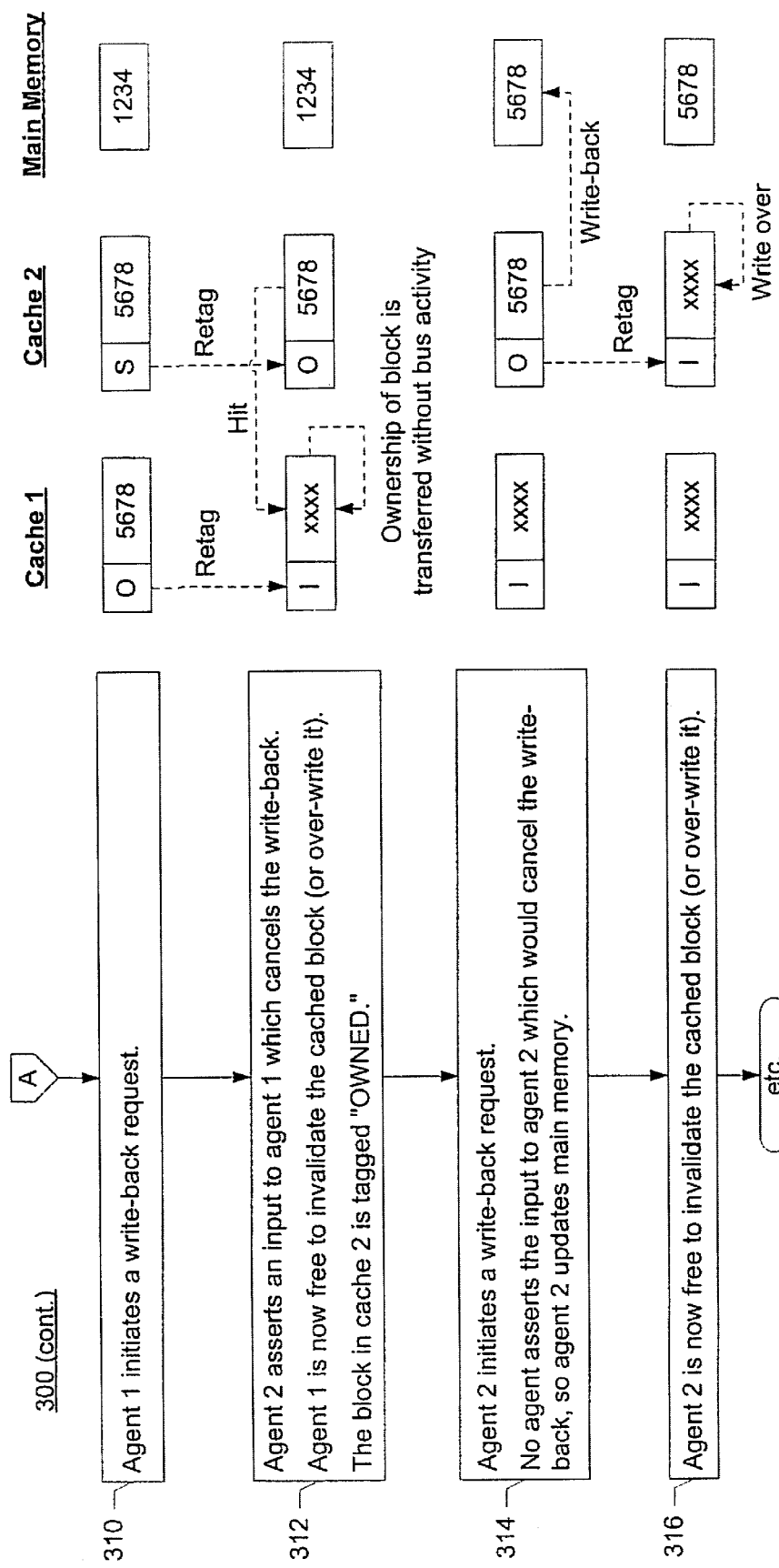

A flowchart of a process 300 for transferring cache block (i.e., cache line) ownership in a two processor system is illustrated in FIGS. 3–4. Adjacent each operation in the illustrated process 300 is a block diagram illustrating example actions taken by each of a first cache 208, a second cache 208, and a main memory 108 during the associated operation. For simplicity in description, only one short memory block is illustrated for each of the first cache 208, the second cache 208, and the main memory 108. Although the process 300 is described with reference to the flowchart illustrated in FIGS. 3–4, a person of ordinary skill in the art will readily appreciate that many other methods of performing the acts associated with process 300 may be used. For example, the order of some of the operations may be changed without departing from the scope or spirit of the present invention. In addition, many of the operations described are optional, and many additional operations may occur between the operations illustrated.

In an embodiment, a "write-back" (as opposed to a "write-through") policy is used. A "write-back" policy is a cache procedure whereby a cache agent 200 may locally modify data in its cache 208 without updating main memory 108 until the memory block needs to be replaced. In order to maintain cache coherency in such a system, a cache coherency protocol may be used. In the described embodiment, a MOESI (i.e., modified, owned, exclusive, shared, invalid) cache coherency protocol is followed. However, a person of ordinary skill in the art will readily appreciate that any cache coherency protocol which includes the equivalent of an "owned" state may be used without departing from the scope or spirit of the present invention. In the well known MOESI cache coherency protocol, an "invalid" block is a block that does not contain useful data (i.e., the block is effectively empty). An "exclusive" block is a block that is "clean" (i.e., the same as main memory) and only held by one cache 208 (e.g., the block was just read in from main memory for the first time). A "modified" block is a block that is "dirty" (i.e., different from main memory) and only held by one cache 208 (e.g., a new value was written to the cache copy, but not to main memory's copy). A "shared" block is a block that is held by more than one cache 208. An "owned" block is a block that is "modified" and "shared" (i.e., "dirty" and held by another cache). The "owner" of a block is responsible for eventually updating main memory 108 with the modified value (i.e., the "owner" is responsible for performing the write-back).

In one embodiment, the state of a cached memory block is recorded in a cache directory. In another embodiment, the state of a cached memory block is recorded in a tag associated with the cached memory block. In the MOESI cache coherency protocol there are five possible states. Accordingly, each state may be represented by a different digital combination (e.g., 000=Modified, 001=Owned, 010=Exclusive, 011=Shared, 100=Invalid). Retagging a cached memory block is the act of changing the state of the cached memory block. For example, retagging a block from "shared" to "owned" may be accomplished by changing a tag associated with the block from "011" to "001." Of course, a person of ordinary skill in the art will readily appreciate that any method of storing and changing cache a block state may be used without departing from the scope and spirit of the present invention.

Generally, process 300 illustrates an example of an ownership transfer of a memory block from the first cache 208 to the second cache 208 without performing a writeback to the main memory 108. Prior to the ownership transfer, the first cache 208 holds the memory block in an "owned" state, and the second cache 208 holds the same memory block in a "shared" state. The memory block in the second cache 208 includes modifications made to the memory block by a CPU 206 associated with the first cache 208. However, the main memory 108 does not yet reflect these modifications.

When the CPU 206 associated with the first cache 208 attempts to write-back the modified memory block to main memory 108, the second cache 208 detects a "hit" and asserts the "hit in" line to the first cache 208 which cancels the write-back. In addition, the memory block in the second cache 208 changes to an "owned" state. By transferring ownership in this manner, communications with main memory and power consumption are reduced.

The process 300 begins when a first processing agent 200 initiates a read request for a particular memory block (operation 302). In this example, the first cache 208 includes a position that is tagged "invalid." Of course, a person of ordinary skill in the art will readily appreciate that a cache position need not be tagged invalid to be over-written, and many well known cache replacement protocols, such as least recently used (LRU), may be used to determine which cache position is to be over-written.

No other cache 208 currently holds the requested memory block (e.g., no "hit" is generated by the second cache 208 or a cache directory indicates that the second cache 208 does not hold the requested block), so main memory 208 supplies the requested block to the first cache 208 (operation 304). This action may require the memory controller 202 to access the main memory 108 via the system interconnect 106. The cached block is tagged "exclusive" to indicate that no other cache 208 currently holds this block (operation 304).

Subsequently, the first agent 200 may need to write a new value to the cached block (operation 306). The cached block is currently tagged "exclusive," therefore, the first agent 200 may write to the cached copy without notifying other agents 200 of the change, because no other cache 208 holds a copy of the same block. In addition, the lock may be tagged "modified" to indicate that the cached copy is different than the main memory copy (operation 306). In other words first agent 200 must remember to eventually write-back the new value to main memory 108.

If the second processing agent 200 initiates a read request for the same memory block, the first cache 208 detects a "hit" (e.g., by snooping the address bus shared by the first and second agents or using a cache directory) (operation 308). Because the first cache 208 is holding the block in the "modified" state (i.e., the block is dirty), the first cache 208 may intervene and supply the block to the second cache 208 via the cache interconnect 204 (operation 308). If instead, the main memory 108 were allowed to supply the block without first being updated, the second cache 208 would contain the wrong value for the block. The memory block in the second cache 208 may be tagged "shared" to indicate that another cache 208 also holds this memory block (operation 308). In other words, writes to this block need to update or invalidate copies in other caches 208. The block in the first cache 208 may be tagged "owned" to indicate that (1) another cache 208 also holds this memory block, and (2) this cache is responsible for eventually updating main memory 108 with the modified version of the block (operation 308). In other words, the block is shared and modified, and the first cache must remember to initiate a write-back of the block before it writes over the block.

Subsequently, the first processing agent 200 may need to over-write this cache position with other data, but the first cache 208 is the "owner" of the memory block. As a result, the first processing agent 200 is responsible for updating the main memory 108. Accordingly, the first processing agent 200 initiates a write-back request (operation 310).

By snooping the cache interconnect 204 (or monitoring a cache directory), the second processing agent 200 determines that the first processing agent 200 is about to perform a write-back for a block that the second agent is currently holding in a "shared" state (operation 312). In response, the second agent 200 may assert its "hit out" line which is connected to the first agent's "hit in" line. This has the affect of canceling the write-back (operation 312). The first agent 200 is now free to invalidate the cached block and/or over-write the cache position (operation 312). The block in the second cache 208 may be tagged "owned" so the second cache 208 remembers to eventually update main memory 108 (operation 312). Optionally, the block in the second cache 208 may be tagged "modified" instead of "owned" if the second cache 208 is the only other holder of the block, as would be the case in a two processor system. In operation 312, ownership of the block is transferred from the first cache 208 to the second cache 208 without accessing main memory 108. In fact, ownership of the block is transferred without the need for additional activity on the system interconnect 106 or the cache interconnect 204. If the second agent 200 further modifies the block, the second agent may do so locally (i.e., without interconnect traffic). In this manner, latency and power are both reduced.

Subsequently, the second processing agent 200 may need to over-write this cache position with other data, but the second cache 208 is now the "owner" of the memory block. In other words, the second processing agent 200 has taken over responsibility for updating the main memory 108. Accordingly, the second processing agent 200 initiates a write-back request (operation 314). No other agent 200 asserts a "hit" which would cancel the write-back, so the second agent 200 updates the main memory 108 (operation 314). This write-back may require the memory controller 202 to access the main memory 108 via the system interconnect 106. The second agent 200 is now free to invalidate the cached block and/or over-write the cache position (operation 316).

Figure 5:
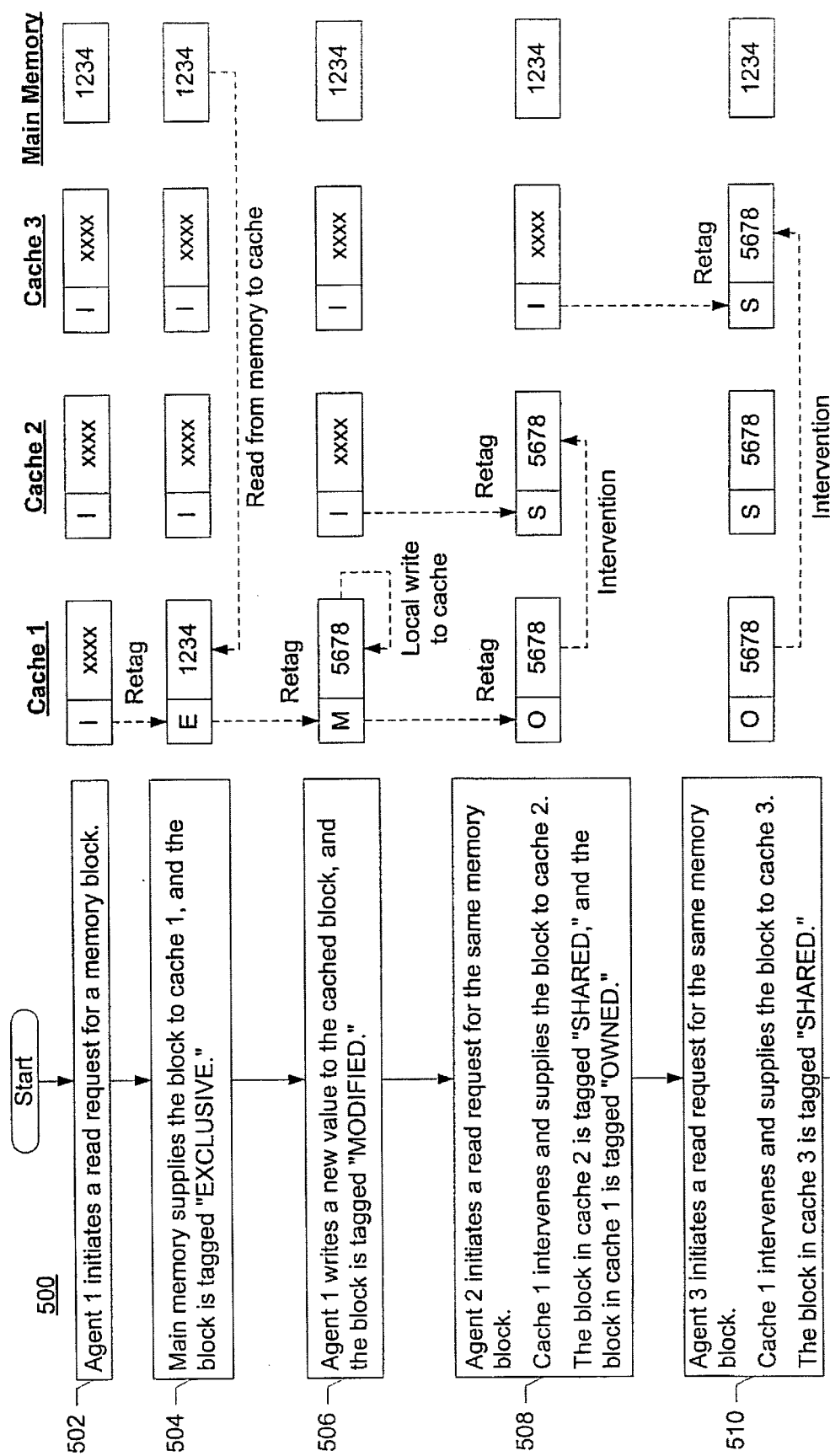
FIGS. 5 and 6 are a flowchart of a process for transferring cache block ownership in a multi-processor system.
Figure 6:
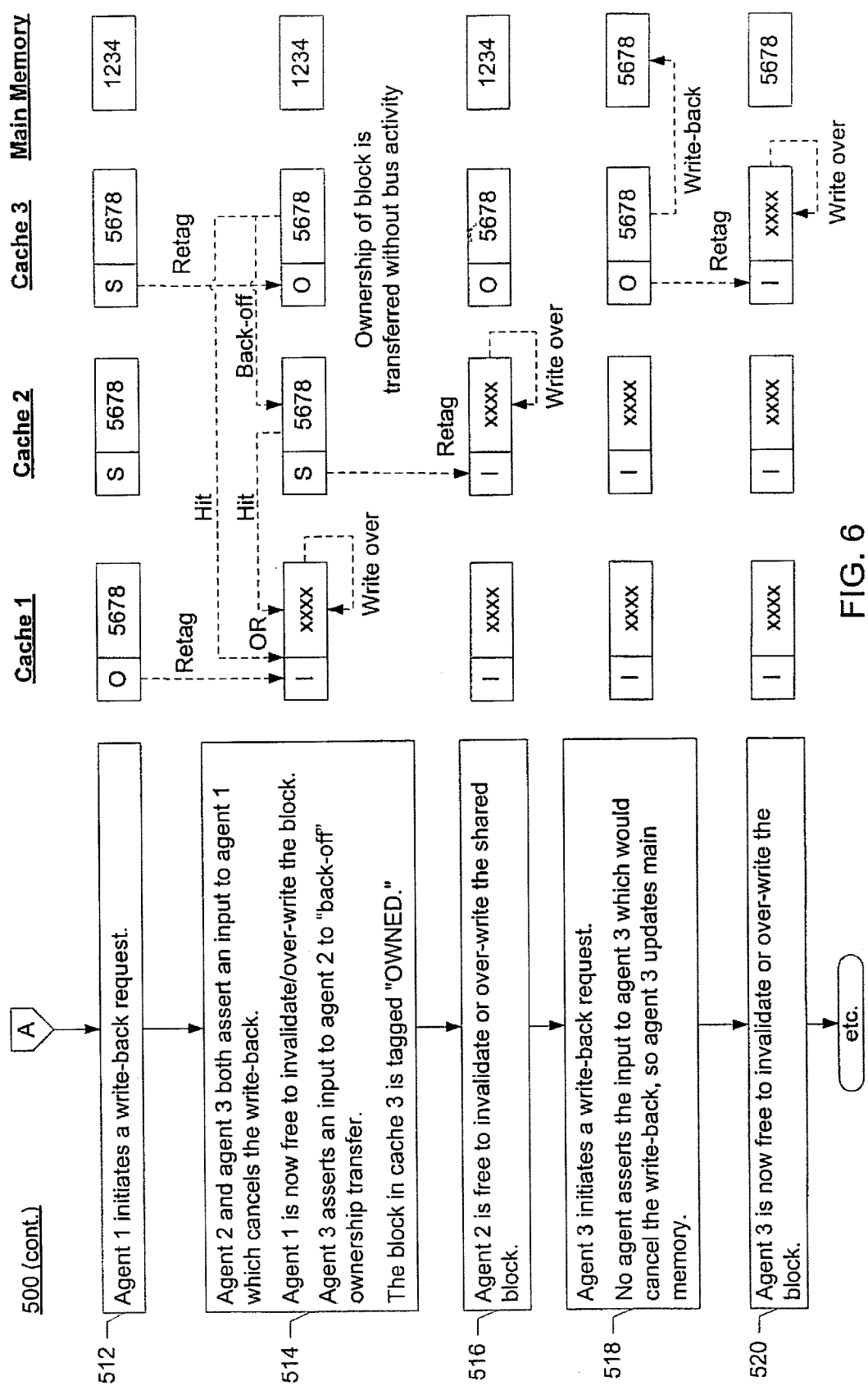

A flowchart of a process 500 for transferring cache block (i.e., cache line) ownership in a multi-processor system is illustrated in FIGS. 5–6. Adjacent each operation in the illustrated process 500 is a block diagram illustrating example actions taken by each of a first cache 208, a second cache 208, a third cache 208, and a main memory 108 during the associated operation. For simplicity in description, only one short memory block is illustrated for each of the first cache 208, the second cache 208, the third cache 208, and the main memory 108. Although the process 500 is described with reference to the flowchart illustrated in FIGS. 5–6, a person of ordinary skill in the art will readily appreciate that many other methods of performing the acts associated with process 500 may be used. For example, the order of some of the operations may be changed without departing from the scope or spirit of the present invention. In addition, many of the operations described are optional, and many additional operations may occur between the operations illustrated. In the described embodiment, a MOESI cache coherency protocol is followed. However, a person of ordinary skill in the art will readily appreciate that any cache coherency protocol which includes the equivalent of an "owned" state may be used without departing from the scope or spirit of the present invention.

Generally, process 500 illustrates an example ownership transfer of a memory block from the first cache 208 to the third cache 208 without performing a writeback to the main memory 108. Prior to the ownership transfer, the first cache 208 holds the memory block in an "owned" state, the second cache 208 holds the same memory block in a "shared" state, and the third cache 208 also holds the memory block in a "shared" state. Because more than one cache is available to assume ownership, an arbitration mechanism is employed. When the CPU 206 associated with the first cache 208 attempts to perform a write-back, the second cache 208 and/or the third cache 208 may assert a "hit" to the first cache 208 which cancels the write-back. In addition, the third cache 208 may assert the "back-off" input of the second cache. The memory block in the second cache 208 stays in the "shared" state as a result of the "back-off" input being asserted. The memory block in the third cache 208 changes to an "owned" state because no higher priority cache asserts the "back-off" input of the third cache. By transferring ownership in this manner, communications with main memory and power consumption are reduced.

The process 500 begins when a first processing agent 200 initiates a read request for a particular memory block (operation 502). In this example, the first cache 208 includes a position that is tagged "invalid." Of course, a person of ordinary skill in the art will readily appreciate that a cache position need not be tagged invalid to be over-written, and many well known cache replacement protocols, such as least recently used (LRU), may be used to determine which cache position is to be over-written.

No other cache 208 currently holds the requested memory block (e.g., no "hit" is generated), so main memory 108 supplies the request block to the first cache 208 (operation 504). This action may require the memory controller 202 to access the main memory 108 via the system interconnect 106. The cached block may be tagged "exclusive" to indicate that no other cache 208 currently holds this block (operation 504).

Subsequently, the first agent 200 may need to write a new value to the cached block (operation 506). The cached block is currently tagged "exclusive," therefore, the first agent 200 may write to the cached copy without notifying other agents 200 of the change, because no other cache 208 holds a copy of the same block. After writing the new value, the cached block may be retagged to "modified" to indicate that the cached copy is different than the main memory copy (operation 506). In other words, the first agent 200 must remember to eventually write-back the new value to main memory 108.

If the second processing agent 200 initiates a read request for the same memory block, the first cache 208 detects a "hit" (e.g., by snooping the address bus or via a cache directory) (operation 508). Because the first cache 208 is holding the block in the "modified" state (i.e., the block is dirty), the first cache 208 may intervene and supply the block to the second cache 208 via the cache interconnect 204 (operation 508). If the main memory 108 supplied the block without first being updated, the second cache 208 would contain the wrong value for the block. The memory block in the second cache 208 may be tagged "shared" to indicate that another cache 208 also holds this memory block (operation 508). In other words, writes to this block need to update or invalidate copies in other caches 208. The block in the first cache 208 may be tagged "owned" to indicate that (1) another cache 208 also holds this memory block, and (2) this cache is responsible for eventually updating main memory 108 with the modified version of the block (operation 508). In other words, the block is shared and modified, and the first cache must remember to initiate a write-back of the block before it writes over the block.

If the third processing agent 200 initiates a read request for the same memory block, the first and second caches 208 both detect a "hit" (e.g., by snooping the address bus or via a cache directory) (operation 510) Because the first cache 208 is holding the block in the "owned" state, the first cache 208 may intervene and supply the block to the third cache 208 via the cache interconnect 204 (operation 510). The memory block in the third cache 208 may be tagged "shared" to indicate that another cache 208 also holds this memory block (operation 510). The block in the first cache 208 may stay in the "owned" state.

Subsequently, the first processing agent 200 may need to over-write this cache position with other data, but the first cache 208 is the "owner" of the memory block. As a result, the first processing agent 200 is responsible for updating the main memory 108. Accordingly, the first processing agent 200 initiates a write-back request (operation 512).

By snooping the cache interconnect 204 (or monitoring a cache directory), the second processing agent 200 determines that the first processing agent 200 is about to perform a write-back for a block that the second processing agent 200 is currently holding in a "shared" state (operation 514). Similarly, the third processing agent 200 determines that the first processing agent 200 is about to perform a write-back for a block that the third processing agent 200 is currently holding in a "shared" state (operation 514). In response, the second agent 200 and/or the third agent 200 may assert their respective "hit out" lines which may be connected to the first agent's "hit in" line via an OR gate 210. Assertion of the first agent's "hit in" line has the affect of canceling the write-back (operation 514). The first agent 200 is now free to invalidate the cached block and/or over-write the cache position (operation 514).

In addition, the third cache 208 may assert the "back-off" input of the second cache (operation 514). The memory block in the second cache 208 may stay in the "shared" state as a result of the "back-off" input being asserted. The memory block in the third cache 208 may change to an "owned" state because no higher priority cache asserts the "back-off" input of the third cache (operation 514). In operation 514, ownership of the block is transferred from the first cache 208 to the third cache 208 (i.e., the "arbitration winner" cache) without accessing main memory 108. In fact, ownership of the block is transferred without the need for additional activity on the system interconnect 106 or the cache interconnect 204. If the third agent 200 further modifies the block, the third agent may do so without additional writes to the main memory 108 (however, the shared copy in the second cache must be updated or invalidated). In this manner, latency and power are both reduced. Alternatively, a cache directory entry may be selected to determine the arbitration winner cache based on a predetermined order of precedence.

Subsequently, the second processing agent 200 may need to over-write this cache position with other data. Because the second cache 208 holds the block in the "shared" state, the second agent is free to invalidate and/or over-write the block (operation 516).

Eventually, the third processing agent 200 may need to over-write this cache position with other data, but the third cache 208 is now the "owner" of the memory block. In other words, the third processing agent 200 has taken over responsibility for updating the main memory 108. Accordingly, the third processing agent 200 may initiate a write-back request (operation 518). No other agent 200 asserts a "hit" which would cancel the write-back (i.e., "hit-in" on the third agent is not asserted), so the third agent 200 updates the main memory 108 (operation 518). This write-back may require the memory controller 202 to access the main memory 108 via the system interconnect 106. The third agent 200 is now free to invalidate the cached block and/or over-write the cache position (operation 520).

In summary, persons of ordinary skill in the art will readily appreciate that a method and apparatus for transferring cache block ownership has been provided. Systems implementing the teachings described herein may benefit from a reduction in memory latency, bus traffic, and power consumption.

The foregoing description has been presented for the purposes of illustration and description. It is not intended to be exhaustive or to limit the invention to the example embodiments disclosed. Many modifications and variations are possible in light of the above teachings. It is intended that the scope of the invention be limited not by this detailed description of example embodiments, but rather by the claims appended hereto.

What is claimed is:

1. A method of transferring ownership of a memory block, the method comprising:
    establishing a predefined arbitration hierarchy among a first cache, a second cache, and a third cache;
    storing a first copy of the memory block in the first cache as owned;
    storing a second copy of the memory block in the second cache as shared;
    storing a third copy of the memory block in the third cache as shared;
    writing over the first copy of the memory block in the first cache; and
    retagging one of the second copy of the memory block in the second cache and the third copy of the memory block in the third cache from shared to owned in accordance with the predefined arbitration hierarchy.

2. A method as defined in claim 1, wherein storing the first copy of the memory block in a first cache as owned comprises:
    writing a new value into the first copy of the memory block in the first cache; and
    retagging the first copy of the memory block in the first cache as modified.

3. A method as defined in claim 2, wherein storing the first copy of the memory block a first cache as owned comprises:
    reading the first copy of the memory block into the first cache from a main memory; and
    storing the first copy of the memory block in the first cache as exclusive.

4. A method as defined in claim 2, wherein storing the second copy of the memory block in the second cache as shared comprises:
    snooping a bus to detect a read request associated with the memory block by an agent associated with the second cache;
    supplying the memory block from the first cache; and
    storing the first copy of the memory block in the first cache as owned.

5. A method as defined in claim 2, further comprising:
    detecting a read request associated with the memory block by an agent associated with the second cache by using a cache directory;
    supplying the memory block from the first cache; and
    retagging the first copy of the memory block in the first cache as owned.

6. A method as defined in claim 1, wherein retagging the one of the second copy of the memory block an the third copy of the memory block from shared to owned in accordance with the predefined arbitration hierarchy comprises selecting a directory entry associated with the one of the second cache and the third cache.

7. A method as defined in claim 1, wherein the predefined arbitration hierarchy is implemented by a back-off based arbitration mechanism.

8. A method of transferring ownership of a memory block, the method comprising:
    storing a first copy of the memory block in a first cache as owned;
    storing a second copy of the memory block in a second cache as shared;
    writing over the first copy of the memory block in the first cache;
    retagging the second copy of the memory block in the second cache from shared to owned; and
    arbitrating ownership of the memory block between the second cache and a third cache which holds a third copy of the memory block, wherein the third copy of the memory block in the third cache is stored as shared before retagging the second copy of the memory block in the second cache and after retagging the second copy of the memory block in the second cache.

9. A multi-processing computing device comprising:
    a first agent including first signal input;
    a second agent including a first signal output and a second signal input, the first signal input of the first agent to receive the first signal output of the second agent;
    a third agent including a second signal output, the first signal input of the first agent and the second signal input of the second agent to receive the second signal output of the third agent;

a main memory coupled to the first agent, the second agent, and the third agent;

the first agent to cancel a write back operation if the first signal input of the first agent is asserted by either or both of the first signal output of the second agent and the second signal output of the third agent, and the second agent retag a memory block from a shared state to an owned state if the first signal output of the second agent is asserted and the second signal output of the third agent is not asserted, and the second agent to leave the memory block tagged in the shared state if the second signal output of the third agent is asserted.

10. A multi-processing computing device as defined in claim 9, wherein the first agent is to write over the first memory block if the first signal input of the first agent is asserted by the first signal output of the second agent and the first memory block is in an owned state.

11. A multi-processing computing device as defined in claim 9, wherein the first agent performs the writeback operation to the main memory if the first signal input of the first agent is not asserted.

12. A multi-processing computing device comprising:

a first agent including a first signal input;

a second agent including a first signal output, the first signal input of the first agent to receive the first signal output of the second agent;

a third agent including a second signal output; and a main memory coupled to the first agent, the second agent, and third agent, the first agent to write over a first memory block in response to canceling a write back operation if the first signal input of the first agent is asserted by the first signal output of the second agent, the second agent further including a second signal input, the second signal input of the second agent to receive the second signal output of the third agent, and the second agent to retag a second memory block in the second agent from a shared tag to an owned tag if the first signal output of the second agent is asserted and the second signal input of the second agent is not asserted.

13. A multi-processing computing device as defined in claim 12, further comprising a logical OR unit, the logical OR unit including a first OR input, a second OR input, and an OR output, the first OR input to receive the first signal output of the second agent, the second OR input to receive the second signal output of the third agent, the first signal input of the first agent to receive the OR output.

14. A multi-processing computing device as defined in claim 13, wherein the first agent is to write over the first memory block if the first signal input of the first agent is asserted by the second signal output of the third agent.

15. A multi-processing computing device as defined in claim 13, wherein the first agent is to perform the writeback to the main memory if the first signal input of the first agent is not asserted.

16. A computer comprising:

a first microprocessor including a first cache controller and a first signal input;

a second microprocessor including a second cache controller, a first signal output indicative of a cache hit, and a second signal input, the first signal input to receive the first signal output;

a third microprocessor including a third cache controller and a second signal output indicative of a cache hit, the first signal input and the second signal input to receive the second signal output of the third microprocessor;

a main memory coupled to the first microprocessor, the second microprocessor, the third microprocessor;

the first cache controller to cancel a writeback if the first signal input of the first microprocessor is asserted by either or both of the first signal output of the second microprocessor and the second signal output of the third microprocessor, and the third microprocessor to retag a memory block from a shared state to an owned state if the second signal output of the third microprocessor is asserted irrespective of whether the first signal output of the second microprocessor is asserted.

17. A computer as defined in claim 16, further comprising:

a power supply coupled to the first microprocessor;

a mother board coupled to the first microprocessor;

a hard drive coupled to the first microprocessor; and a graphics card coupled to the first microprocessor.

18. A computer as defined in claim 17, further comprising:

an input device coupled to the first microprocessor; and an output device coupled to the first microprocessor.

19. A computer as defined in claim 18, wherein the input device comprises at least one of a keyboard, a mouse, a track pad, an isopoint, a microphone, and a graphics tablet.

20. A computer as defined in claim 18, wherein the output device comprises at least one of a display, a printer, a modem, a network card, and a speaker.

21. A cache controller comprising:

a signal output indicative of a cache hit;

a signal input indicative of an ownership assertion from at least one cache controller that is predefined to have a higher rank in a predefined arbitration hierarchy; and a cache interconnect;

the cache controller to cause a memory block to be stored in a shared state;

the cache controller to detect an initiation of a memory writeback associated with the memory block, the cache controller to assert the signal output in response to the initiation of the memory writeback associated with the memory block, the cache controller to cause a modification of the state of the memory block from the shared state to an owned state in response to the initiation of the memory writeback associated with the memory block only if the signal input is not asserted.

22. A ache controller as defined in claim 21, wherein the cache controller is to detect the initiation of the memory writeback associated with the memory block by snooping the cache interconnect.

23. A cache controller as defined in claim 21, wherein the cache controller is to detect the initiation of the memory writeback associated with the memory block by using a cache directory.

24. A method as defined in claim 1, wherein if only one of the second and third caches store a copy of the memory block as shared, the one of the second and third caches is retagged from shared to owned when the first cache evicts the first copy of the memory block.

25. A method as defined in claim 1, wherein the other one of the second and third caches which is not retagged from shared to owned remains tagged as shared.

26. A multi-processing computing device as defined in claim 9, wherein the third agent to retag a memory block from a shared state to an owned state if the second signal output of the third agent is asserted irrespective of whether the first signal output of the second agent is asserted.

27. A multi-processing computing device comprising:
   a first processor with a first cache;
   a second processor with a second cache;
   a third processor with a third cache;
   a cache interconnect coupling the first, second and third processors; and
   a main memory;
   wherein the first processor has a first input port to receive a write-back cancellation signal and a first output port to output a write-back cancellation and back-off signal, the second processor has a second input port to receive the write-back cancellation signal and a second output port to output a write-back cancellation and back-off signal, and the third processor has a third input port to receive the write-back cancellation signal and a third output port to output a write-back cancellation and back-off signal.

28. A multi-processing computing device as defined in claim 27, further comprising:
   a first OR gate to combine the write-back cancellation and back-off signal from the first processor and the write-back cancellation and back-off signal from the second processor into first combined write-back cancellation and back-off signal; and
   a second OR gate to combine the first combined write-back cancellation and back-off signal from the first OR gate and the write-back cancellation and back-off signal from the third processor into a second combined write-back cancellation and back-off signal.

29. A multi-processing computing device as defined in claim 28, wherein the second combined write-back cancellation and back-off signal is input to the first, second and third input ports.

30. A ulti-processing computing device as defined in claim 28, wherein the first processor includes a first back-off input port, the second processor includes a second back-off input port, and the third processor includes a third back-off input port.

31. A multi-processing computing device as defined in claim 30, wherein the write-back cancellation and back-off signal output by the first output port is input to the second back-off input port, and the first combined write-back cancellation and back-off signal is input to the third back-off input port.

* * * * *